United States Patent [19]

Greenland

[11] Patent Number: 5,722,220
[45] Date of Patent: Mar. 3, 1998

[54] APPARATUS AND METHOD FOR CONTAINING MATERIAL

[76] Inventor: Deenya Greenland, 154 Mosby Cir., Warrenton, Va. 22186

[21] Appl. No.: 49,650

[22] Filed: Apr. 21, 1993

[51] Int. Cl.⁶ .................................................. B65D 30/10
[52] U.S. Cl. ...................... 53/462; 229/87.01; 383/4; 428/136
[58] Field of Search .................... 383/4, 118; 229/87.01; 53/462; 428/134, 135, 136

[56] References Cited

U.S. PATENT DOCUMENTS

| | | | |
|---|---|---|---|
| 1,236,285 | 8/1917 | Gallie | 383/77 |
| 2,749,957 | 6/1956 | Smith | |
| 2,766,797 | 10/1956 | Cowen | |
| 3,024,824 | 3/1962 | Bass | 383/4 |
| 3,069,067 | 12/1962 | Crane | 383/118 |
| 4,366,949 | 1/1983 | Staub, Sr. | |
| 4,445,230 | 4/1984 | Spadaro | 383/77 |
| 4,602,664 | 7/1986 | Hullen | 383/4 |
| 4,682,447 | 7/1987 | Osborn | |
| 4,890,736 | 1/1990 | Greyvenstein | 383/77 |
| 4,955,068 | 9/1990 | Tennihan | 383/4 |
| 5,092,681 | 3/1992 | Ashley, III | |
| 5,289,670 | 3/1994 | Morgan et al. | |

*Primary Examiner*—Stephen P. Garbe
*Attorney, Agent, or Firm*—Morgan & Finnegan

[57] ABSTRACT

An apparatus manufactured from a single sheet of flexible material. The sheet includes a plurality of peripheral sections, wherein at least one of the sections includes an opening through which remaining sections may be passed to gather and enclose material contained within the sheet. Preferably, the sheet is in the shape of a square, and includes a pair of slits in adjacent corners of the sheet. In use, the instant invention is laid on the ground in an area near the material to be bagged. The individual then places the material onto the sheet until the sheet is full. Once the sheet is full, one of the unslitted corners is pulled across the sheet to the farthest corner having a slit. The unslitted end is then pulled through the slit such that a portion of the unslitted end is exposed on the other side of the sheet. Next, the other unslitted end is pulled across the sheet and through the remaining slit such that a portion of the second unslitted end is exposed on the other side of the sheet. Finally, the first and second unslitted ends are tied together.

11 Claims, 1 Drawing Sheet

APPARATUS AND METHOD FOR CONTAINING MATERIAL

BACKGROUND OF THE INVENTION

1. Field of the Invention

The present invention relates to bags for the collection of debris, especially a simple and inexpensive bag for the collection of leaves.

2. Background of the Invention

A variety of bags are known in the prior art which are intended to be laid across the ground and subsequently gathered to dispose of garbage, leaves, and other unwanted debris. For example, U.S. Pat. No. 5,092,681, to Ashley, III, discloses a drawstring trash container which is laid flat upon the ground while trash is placed on the container. The trash container includes a drawstring which extends around the outer periphery of the container. In use, debris is loaded onto the trash container while it lays flat on the ground. Once a sufficient amount of trash is positioned on the container, the drawstring is pulled to enclose all of the debris within the container. U.S. Pat. No. 4,955,068, to Tennihan, discloses a similar bag which utilizes a drawstring to close a circular sheet into a closed bag. Tennihan also discloses the use of spikes, positioned along the peripheral edge of the sheet, to securely hold the sheet in position when it is placed on the ground.

U.S. Pat. No. 2,766,797, to Cowen, discloses a gathering device. The gathering device includes a flat sheet having grommets located in each corner of the sheet and a string passing through the grommets. In use, the string is passed through the grommets so that as the string is pulled the edges of the sheet come together to form a bag or receptacle for any material positioned on the sheet. U.S. Pat. No. 4,602,664, to Hullen, discloses a method and apparatus for collecting and packaging lawn debris. The apparatus consists of a series of net blankets positioned around a tree to ease the burden of gathering leaves. As the leaves fall and accumulate on the nets, the nets are bundled into disposable leaf packages and sealed. Hullen also discloses a handle that may be used in conjunction with bundled leaf packages to easily transport the same. The handle consists of a separate member which is attached to the net after the bundle is formed. U.S. Pat. No. 4,682,447 (Osborn) and U.S. Pat. No. 4,366,949 (Staub, Sr.) disclose the use of flat sheets in gathering and disposing of leaves.

U.S. Pat. No. 3,204,824 (Bass) and U.S. Pat. No. 2,749,957 (Smith) disclose flat sheets whose ends are drawn together to form receptacles for a variety of materials. The article holder disclosed by Bass includes male and female fasteners on opposite corners of the container. The fasteners are secured together to enclose the material. The device further includes a pair of loops at opposite ends of the sheet that may be secured together by a ribbon or ornamental bow. Smith discloses a tobacco carrier consisting of a flat square sheet having corner edges that are drawn together to form an enclosure. Cords or rope secured to the edges of the sheet hold the corners in a closed arrangement.

A review of the prior art discussed above reveals that the devices previously used to gather material within a flat sheet are cumbersome due to the ropes and fastening devices necessary for securely closing the devices. The instant invention overcomes these deficiencies by providing a bag composed of a single flat sheet of plastic, or other suitable material.

SUMMARY OF THE INVENTION

It is an object of the instant invention to provide a simple and inexpensive structure for conveniently collecting and disposing of leaves which accumulate on lawns.

It is a further object of the instant invention to provide a bag requiring a minimal number of parts, which allows for the simple bagging of materials that are not easily placed within a conventional bag.

These objects are met by the instant bag which consists of a single sheet of flexible material. The sheet includes a plurality of peripheral sections, wherein at least one of the sections includes a slit through which the remaining sections may be passed to gather and enclose material contained within the sheet. Preferably, the sheet is in the shape of a square, and includes a pair of slits in adjacent corners of the sheet. The slits can be in any shape or direction which allows the bag to function properly, although it has been found that slits which are at a 45 degree angle with respect to the sides of the sheet work very well.

In use, the instant invention is laid on the ground in an area where leaves have accumulated. The sheet should be secured to the ground so that it will not be accidently moved. The preferred embodiment includes wooden stakes for holding the sheet in position. The individual then rakes the leaves onto the sheet until the sheet is full. Once the sheet is full, the stakes are removed in any convenient order, and one of the unslitted corners is pulled across the sheet to the farthest corner having a slit. The unslitted end is then pulled through the slit such that a portion of the unslitted end is exposed on the other side of the sheet. Next, the other unslitted end is pulled across the sheet and through the remaining slit such that a portion of the second unslitted end is exposed on the other side of the sheet. Finally, the first and second unslitted ends are tied together. This produces a securely closed bag which is now ready to be placed at the sidewalk for trash pick-up or disposed of in any other conventional manner.

It should be noted that the foregoing description discusses the removal of leaves from a lawn. However, the instant invention is intended to be used for bagging anything that is not conveniently placed in conventional bags. For example, the instant invention could be used to dispose of weeds from a garden, or cuttings from an individual's lawn. Additionally, it could be used to dispose of any trash which is more easily swept to a specific location than picked-up and placed within a bag.

DESCRIPTION OF THE PREFERRED EMBODIMENT

Figure 1:
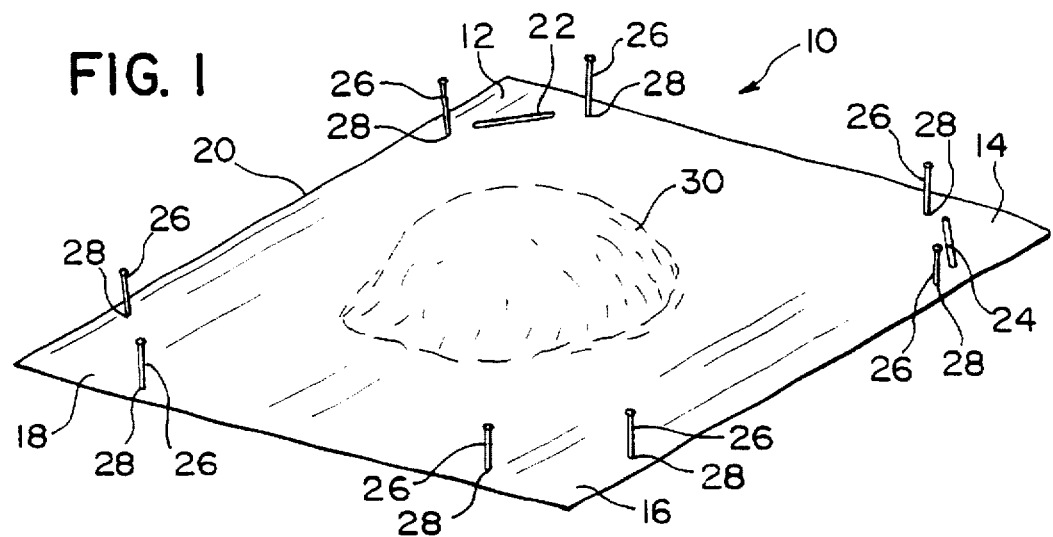
FIGS. 1, 2, 3 and 4 show sequential perspective views of the instant invention as it is utilized to securely enclose materials.
Figure 2:
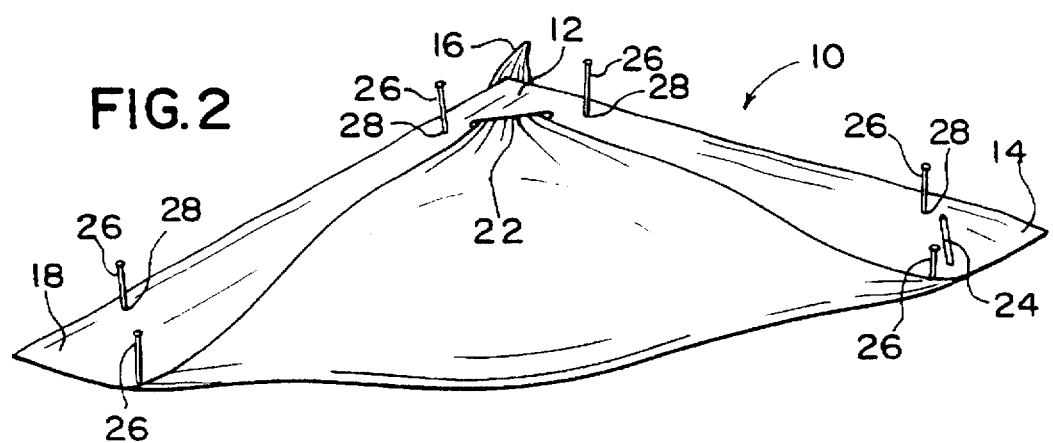
Figure 3:
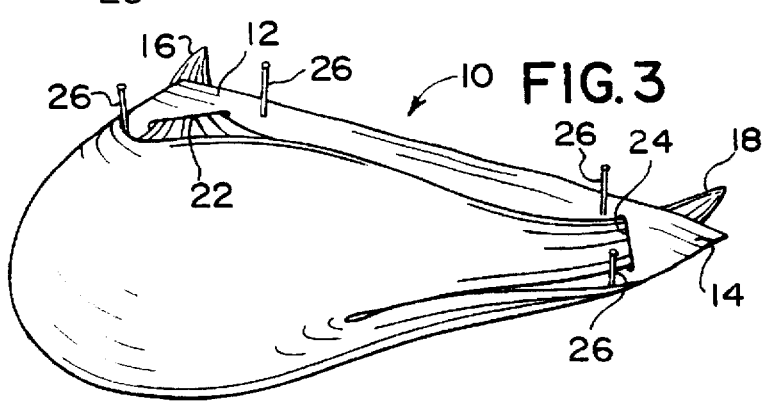
Figure 4:
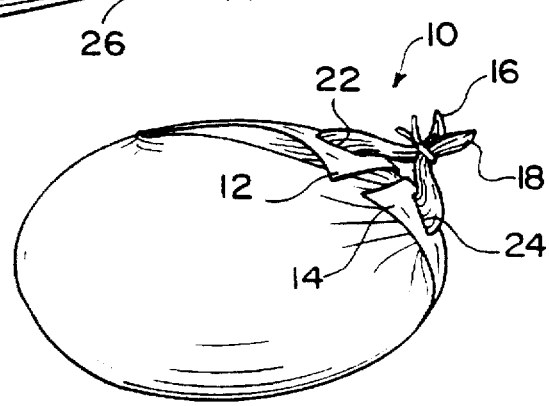

Referring to FIG. 1, the instant invention consists of a rectangular or square sheet 10. The sheet is preferably about six feet long by about six feet wide, and is constructed from thin flexible plastics commonly used in the construction of garbage bags. In such instances, the plastic sheet could be biodegradable and clear. The sheet can also be manufactured from mesh netting, canvas, or any other material that is flexible and substantially cost effective for the purposes of the instant invention. It should be noted that the size discussed above is only exemplary, and a variety of different sizes could be utilized while keeping within the spirit of the instant invention.

The sheet includes first corner 12, second corner 14, third corner 16, and fourth corner 18. As is shown in FIG. 1, the first corner 12 and second corner 14 are adjacent to each other. Further, the first corner 12 is diametrically opposed to the third corner 16, while the second corner 14 is diametrically opposed to the fourth corner 18.

First and second slits 22, 24 are respectively positioned in the first corner 12 and the second corner 14. The slits 22, 24 should be of a size such that the third corner 16 or the fourth corner 18 can be easily passed through the slits 22, 24. It should be noted that the slits 22, 24 could be created in any shape that would allow the instant invention to be used for its intended purpose. For example, the slits 22, 24 could be punched out openings allowing the third corner 16 and the fourth corner 18 to pass therethrough.

The sheet 10 also includes a peripheral edge 20 having a series of holes 28. Wooden stakes 26 are passed through the holes 28 and into a supporting surface to securely hold the sheet in position. Briefly, the sheet 10 is adapted to securely enclose a material 30 by drawing the third corner 16 across the sheet 10 and passing the third corner 16 through the first slit 22. Next, the fourth corner 18 is drawn across the sheet 10 and passed through the second slit 24. The sheet is then securely closed by tieing the third corner 16 and the fourth corner 18 together.

FIGS. 1, 2, 3 and 4 show the procedure for using the instant invention in more detail. The sheet 10 is first laid in a substantially horizontal position. Preferably, the sheet 10 is laid flat on a support surface, such as a lawn containing an abundance of leaves. It should be noted that the sheet need not be perfectly horizontal, but must be orient such that the gravity will not force materials 30 placed upon the sheet 10 to move from the sheet 10.

Stakes 26 are then passed through holes 28 and into the lawn to securely position the sheet 10 on the lawn. The user then rakes the leaves 30, or other debris, onto the sheet until the sheet is full. Once the sheet 10 is full, the stakes 26 adjacent to one of the unslitted corners 16, 18 are removed, and the unslitted corner is pulled across the sheet 10 to the diametrically opposed corner 12 or 14. As shown in the Figures, the stakes 26 adjacent to the third corner 16 are removed allowing the third corner to be drawn across the sheet 10 and passed through the first slit 22 in the first corner 12. The stakes 26 adjacent the fourth corner 18 are then removed, and the fourth corner 18 is then drawn across the sheet 10 and passed through the second slit 24 in the second corner 14. The remaining stakes 26 are then removed, and third corner 16 and fourth corner 18 are tied together to securely enclose the leaves, or other debris within the sheet. Please note, that other conventional fasteners may be used to securely hold the third corner 16 and the fourth corner 18 together. Additionally, the stakes 26 can be removed in any order that will facilitate the simple closure of the sheet 10.

The foregoing description discusses the removal of leaves from a lawn. While this is the primary purpose of the instant invention, it is intended that the instant sheet be used for bagging anything that is not conveniently placed into a conventional bag. For example, the instant invention could be used to dispose of weeds from a garden, or cuttings from an individual's lawn. Additionally, it could be used to dispose of any trash which is more easily swept to a specific location than picked up and placed within a bag.

The preferred embodiment of sheet 10 is disclosed as being rectangular or square. However, the sheet could be any shape that would allow sections of the sheet to pass through slits or openings to securely enclose a material. For example, the sheet could be circular, oval, or any polygonal shape.

While the preferred embodiment of the invention has been described above, it will be recognized and understood that various modifications may be made therein, and the appended claims are intended to cover all such modifications that may fall within the spirit and scope of the invention.

What is claimed is:

1. An apparatus for containing material comprising,
   a flat sheet of flexible material having a plurality of peripheral sections;
   first and second sections, said first and second sections each including an opening of size and dimension such that at least one of said peripheral sections is able to be passed through said opening to an extent sufficient to gather and enclose material disposed on said sheet, wherein said first section and said second section are adjacent to each other and said first section and said second section each include an opening therein; and
   third and fourth sections.

2. An apparatus according to claim 1, wherein said third section is diametrically opposed to said first section and said fourth section is diametrically opposed to said second section;
   said sheet being adapted to securely enclose a material by drawing said third section across said sheet and passing said third section through said opening in said first section, drawing said fourth section across said sheet and passing said fourth section through said opening in said second section, and tieing said third section and fourth sections together.

3. An apparatus according to claim 2, wherein said third section and said fourth section are free of openings.

4. An apparatus for containing material comprising,
   a single flat sheet of flexible material;
   said sheet having first, second, third and fourth corners, wherein said first corner and said second corner are adjacent to each other, and said first corner and said second corner each include an opening therein;
   wherein said third corner is diametrically opposed to said first corner and said fourth corner is diametrically opposed to said second corner;
   said sheet being adapted to securely enclose a material by drawing said third corner across said sheet and passing said third corner through said opening in said first corner, drawing said fourth corner across said sheet and passing said fourth corner through said opening in said second corner, and tieing said third and fourth corners together.

5. An apparatus according to claim 4 wherein said sheet is rectangular.

6. An apparatus according to claim 5 wherein said sheet is square.

7. An apparatus according to claim 4, wherein said third corner and said fourth corner are free of any openings.

8. A method for containing materials comprising the steps of:
   orienting a flexible sheet having a plurality of peripheral sections in a substantially horizontal position, wherein a first section includes a first opening and a second section includes a second opening, and said first section and second section are adjacent;
   positioning material on said sheet;
   passing a third section through said first opening and a fourth section through said second opening to an extent sufficient to gather and enclose said material within said sheet.

9. A method according to claim 8, wherein said third section is diametrically opposed to said first section and said fourth section is diametrically opposed to said second section.

10. A method according to claim 8, further including the steps of:

drawing said third section across said sheet and passing said third section through said first opening in said first section;

drawing said fourth section across said sheet and passing said fourth section through said second opening in said second section;

securing said third section to said fourth section to securely enclose said material with said sheet.

11. A method according to claim 9, wherein said third section and said fourth section are secured together by tieing them together.

* * * * *